(12) United States Patent
Malhotra

(10) Patent No.: US 10,584,037 B2
(45) Date of Patent: Mar. 10, 2020

(54) SYSTEMS TO MAKE LITHIUM HYDROXIDE MONOHYDRATE FROM LITHIUM SALTS

(71) Applicant: Malvi Technologies, LLC, Cedar City, UT (US)

(72) Inventor: Vinod Malhotra, Cedar City, UT (US)

(73) Assignee: MALVI TECHNOLOGIES, LLC, Cedar City, UT (US)

( * ) Notice: Subject to any disclaimer, the term of this patent is extended or adjusted under 35 U.S.C. 154(b) by 0 days.

(21) Appl. No.: 16/405,256

(22) Filed: May 7, 2019

(65) Prior Publication Data

US 2019/0263669 A1    Aug. 29, 2019

Related U.S. Application Data

(62) Division of application No. 15/791,092, filed on Oct. 3, 2017, now Pat. No. 10,329,160.

(60) Provisional application No. 62/412,572, filed on Oct. 25, 2016.

(51) Int. Cl.
*C01D 15/02* (2006.01)
*B01J 49/07* (2017.01)
*B01J 47/10* (2017.01)
*B01J 47/016* (2017.01)
*B01J 49/60* (2017.01)
*B01J 41/05* (2017.01)
*B01J 4/00* (2006.01)
*B01J 8/00* (2006.01)
*B01J 41/12* (2017.01)
*B01J 47/06* (2006.01)

(52) U.S. Cl.
CPC .............. *C01D 15/02* (2013.01); *B01J 4/001* (2013.01); *B01J 8/003* (2013.01); *B01J 41/05* (2017.01); *B01J 41/12* (2013.01); *B01J 47/016* (2017.01); *B01J 47/06* (2013.01); *B01J 47/10* (2013.01); *B01J 49/07* (2017.01); *B01J 49/60* (2017.01); *B01J 2219/0004* (2013.01); *B01J 2219/00018* (2013.01)

(58) Field of Classification Search
CPC ... B01J 8/02; B01J 8/025; B01J 8/0278; B01J 8/10; B01J 8/085; B01J 49/07; B01J 49/60; B01J 41/05; B01J 41/12; C01D 15/02
See application file for complete search history.

(56) References Cited

U.S. PATENT DOCUMENTS

| | | | |
|---|---|---|---|
| 2,884,310 A | 4/1959 | Rosenberg et al. |
| 3,677,937 A | 7/1972 | Higgins et al. |
| 4,291,001 A | 9/1981 | Repsher et al. |
| 4,347,327 A | 8/1982 | Lee et al. |
| 5,681,477 A | 10/1997 | Leavitt |

FOREIGN PATENT DOCUMENTS

EP          1393806 B1    2/2007

OTHER PUBLICATIONS

Non-Final Office Action for U.S. Appl. No. 15/791,092 dated Oct. 25, 2018.
Notice of Allowance for U.S. Appl. No. 15/791,092 dated Feb. 8, 2019.

(Continued)

*Primary Examiner* — Lessanework Seifu
(74) *Attorney, Agent, or Firm* — Dorsey & Whitney LLP

(57) ABSTRACT

Embodiments of the invention relate to systems, methods, and equipment to make lithium hydroxide from lithium salts.

20 Claims, 1 Drawing Sheet

(56) References Cited

OTHER PUBLICATIONS

Restriction Requirement for U.S. Appl. No. 15/791,092 dated Jul. 30, 2018.
U.S. Appl. No. 15/791,092, filed Oct. 23, 2017.
U.S. Appl. No. 62/412,572, filed Oct. 25, 2016.

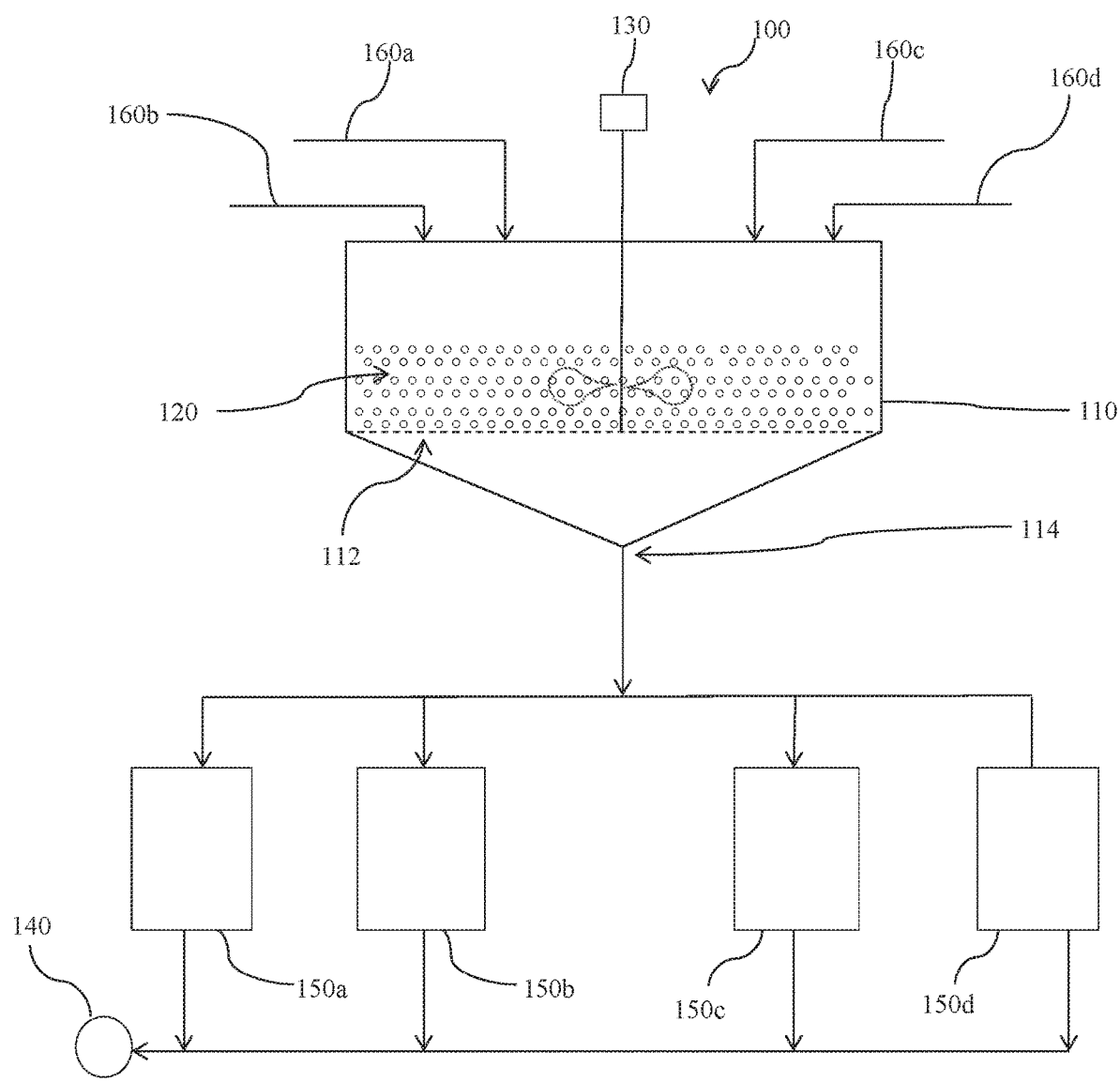

SYSTEMS TO MAKE LITHIUM HYDROXIDE MONOHYDRATE FROM LITHIUM SALTS

CROSS REFERENCE TO RELATED APPLICATIONS

This Application is a divisional of U.S. patent application Ser. No. 15/791,092 filed on 23 Oct. 2017, which claims the benefit of U.S. Provisional Patent Application No. 62/412,572 filed on 25 Oct. 2016, the disclosure of each of which is incorporated herein, in its entirety, by this reference.

SUMMARY

Embodiments of the invention relate to methods and equipment to make lithium hydroxide, such as a lithium hydroxide solution from lithium salts for lithium hydroxide monohydrate production.

A method of producing lithium hydroxide from lithium salts. The method includes contacting a resin bed including anion exchange resin having hydroxyl ions bound thereto with a contacting solution having dissolved lithium salts therein for a duration of time effective to at least partially exchange anions of the dissolved lithium salts with the hydroxyl ions bound to the anion resin. The method includes draining the contacting solution from the resin bed to collect a product solution including at least some lithium hydroxide therein. The method includes washing the resin bed with water effective to displace any residual contacting solution from the anion exchange resin. The method includes soaking the resin bed with a caustic solution effective to displace anions of the lithium salt solution from the anion exchange resin with hydroxyl ions of the caustic solution. The method includes draining the caustic solution from the resin bed to collect a by-product solution.

A system for producing lithium hydroxide from lithium salts is disclosed. The system includes a holding tank having a height and at least one drain. The system includes a resin bed including an anion exchange resin therein, the resin bed having a height less than or equal to the height of the holding tank, the anion exchange resin including hydroxide ions bound thereto. The system includes a retention member disposed in the holding tank between the resin bed and the at least one drain, the retention member being configured to retain the resin bed in the holding tank. The system includes a plurality of input lines, including a first input line operably coupled to a supply of, and configured to deliver, a lithium salt solution into the resin bed in the holding tank; a second input line operably coupled to a supply of, and configured to deliver, a caustic solution into the resin bed in the holding tank; at least a third input line operably coupled to, and configured to deliver, water to the into the resin bed in the holding tank. The system includes a plurality of output containers, including a first output container configured to hold a lithium hydroxide solution produced in the resin bed from interaction thereof with the lithium salt solution; a second output container configured to hold a sodium salt solution produced in the resin bed from interaction thereof with the caustic solution; and at least a third output configured to hold one or more of a wash or rinse solution from the resin bed. The system includes one or more valves and fluid lines operably coupled to the first input line, the second input line, the at least a third input line, the first output container, the second output container, the at least a third output container, and the holding tank.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 1 is a schematic of a system for producing lithium hydroxide from lithium salts, according to an embodiment.

DETAILED DESCRIPTION

Embodiments of the invention relate to methods and equipment to make lithium hydroxide, such as a lithium hydroxide solution from lithium salts for lithium hydroxide monohydrate production. The processes disclosed herein can be used for producing lithium hydroxide monohydrate from lithium salts and/or purified lithium salt solutions generated from leaching lithium ore concentrates. The processes and systems herein can be used to temporarily sequester counterions of lithium salts (e.g., sulfate) on an ion exchange resin to produce lithium hydroxide containing solution which can be further processed to yield lithium hydroxide monohydrate. The processes and systems herein can also include releasing the counterions of the lithium salts from the ion exchange resin using a caustic solution (e.g., NaOH or KOH) to produce an alkaline salt solution having the counterion therein. The ion exchange resin can be washed with water between contacting the lithium salt solution and the caustic solution. The acts of the methods can be carried out in series, which may be repeated one or more times, to continuously produce lithium hydroxide for lithium hydroxide monohydrate production.

Lithium hydroxide monohydrate can be produced from lithium salts by both chemical and electrochemical methods. Chemically, lithium carbonate can be converted to lithium hydroxide by reacting the carbonate salt with lime, producing a slurry comprised of a lithium hydroxide solution and precipitated calcium carbonate. The lithium hydroxide can be separated from solid calcium carbonate, evaporated using multiple effect evaporators to produce lithium hydroxide slurry, which can be further treated to produce dried lithium hydroxide monohydrate product.

A chemical method to make lithium hydroxide from lithium sulfate solution may include causticisation of lithium sulfate, wherein the lithium sulfate solution is mixed with sodium hydroxide to produce a solution mixture of lithium hydroxide and sodium sulfate. From this solution mixture, sodium sulfate can be crystallized out first and then lithium hydroxide product. This separation is difficult and complicated. Some lithium loss occurs in this process as the by-product sodium sulfate is separated from the lithium hydroxide and sodium sulfate solution mixture. This is a significant drawback of the process. A further drawback is that even if there is no market for sodium sulfate, its production using an evaporator or drier is still required in this process including its handling and disposal, adding more steps to the process and increasing operating costs as a result. In other words, in this chemical process the production of lithium hydroxide is dependent on the production of sodium sulfate. The option of discarding the sodium sulfate solution into an evaporation/tailings pond, temporarily or permanently, to balance the market fluctuations is not available in this process.

Electrochemically, lithium hydroxide can be produced from lithium salt solutions including one or more of lithium sulfate, lithium nitrate, lithium carbonate, or lithium chloride. In the case of lithium carbonate, it can be first converted to lithium sulfate by reacting it with sulfuric acid to produce a lithium sulfate solution. Electrolysis of lithium sulfate generates acid on the anode side of the cell and lithium hydroxide on the cathode side of the cell. The anode and cathode compartments of the electrolytic cell can be separated by an ion selective membrane therebetween, such as a cation selective membrane. The acidified lithium sulfate solution can be recycled back to the process to dissolve more lithium carbonate, which avoids the cost of purchasing sulfuric acid to dissolve lithium carbonate. The electrolysis of a lithium nitrate solution is similar to that of the lithium sulfate solution described above. In the case of the lithium chloride solution the anodic reaction produces chlorine gas instead of the acid, while producing lithium hydroxide solution on the cathode side. The chlorine gas, on burning, yields hydrochloric acid which can be recycled back to leach more lithium from lithium bearing ore concentrate. The lithium hydroxide produced by the cell can be evaporated in multiple effect evaporators to produce dried lithium hydroxide monohydrate product.

While the electrochemical method can produce lithium hydroxide from lithium salts including one or more of lithium carbonate, lithium sulfate, lithium chloride and lithium nitrate, the method has some drawbacks. The process is capital intensive, complex, requires feed solutions to be virtually free of impurities, particularly calcium and magnesium. The impurities (e.g., calcium and/or magnesium) tend to plug the cation membrane used by the divided electrolytic cells comprising the electrochemical system, which causes them to lose efficiency or stop working, shutting down the process due to sharp rise in the cell voltage. This can happen immediately upon membrane plugging and cannot be avoided. The power cost also is a serious drawback of the process at locations where the unit power price is high. Though the electrochemical method can be used to produce lithium hydroxide from lithium salts as mentioned above, the method has some drawbacks as mentioned above. The major benefit of the electrochemical methods is that they do not produce—unlike typical chemical methods—any by-product to dispose of or sell.

A chemical method that is capable of producing lithium hydroxide from any of the salts previously mentioned, that is simple, easy to operate, not capital cost intensive, saves power, and offers the options to either produce the by-product if it has a market or discard it when there is no market without losing lithium values in the process, can be used to make lithium hydroxide product more cost effectively than current techniques. The process and the equipment disclosed herein can be used to meet the goals noted above, making it a unique and novel method to produce lithium hydroxide solution for lithium hydroxide monohydrate cost-effectively.

Process and Related Systems

The chemical techniques described herein include an ion-exchange process. The techniques and systems disclosed herein utilize anion exchange resin and sodium hydroxide to produce a lithium hydroxide solution from a lithium sulfate solution. The lithium hydroxide solution upon further processing yields the final product—lithium hydroxide monohydrate. Such a process produces one by-product, sodium sulfate.

FIG. 1 illustrates a system 100 used for the techniques disclosed herein. The system 100 can include a holding tank 110, a resin bed including an ion exchange resin 120 housed within the holding tank 110, an agitator 130 (e.g., over-head mixer) for mixing purposes, at least one vacuum pump 140 to help drain solutions in resin bed as much as practical, a plurality of output containers of receivers 150a-150d for holding feed solutions and processed solutions, and pumps (not shown) to move solutions.

The holding tank 110 can include one or more walls defining an interior space containing the resin bed 120. The holding tank 110 can include a retention member 112 disposed therein. The retention member 112 can be configured as a screen or frits sized and positioned to allow fluid to pass therethrough while retaining the ion exchange resin of the resin bed 120 in the holding tank 110. The holding tank can include a drain 114 operably coupled to one or more of the plurality of output containers 150a-d. Each of the output containers 150a-150d can be operably coupled to a vacuum pump 140 to apply a vacuum to the interior volume thereof, such as to aid in removal of one or more solutions from the holding tank 110. The holding tank 110 and the output containers 150a-d can be operably coupled together via one or more valves and conduits configured to provide a selectively changeable connection therebetween. For example, one or more valves may be actuated to cause a solution in the holding tank 110 to drain into a first output container 150a, and then another set of valves may be actuated to cause a second solution in the holding tank 110 to drain into a output second container 150b, and so on. The holding tank 110 can be relatively shallow, such as having a ratio of width to height of about 3 or more. The height of the resin bed 120 in the holding tank 110 can be about 6 inches or more. In embodiments, the resin bed 120 may have a height less than the height of the holding tank 110.

The system 100 can include a plurality of input lines operably coupled to the holding tank 110, such as the plurality of input lines 160a-160d. The plurality of input lines 160a-160d can include a first input line 160a operably coupled to a supply of, and configured to deliver, a first solution (e.g., lithium salt solution) into the resin bed in the holding tank; a second input line operably coupled to a supply of, and configured to deliver, a second solution (e.g., caustic solution) into the resin bed in the holding tank; and at least a third input line—third input line 160c and fourth input line 160d—operably coupled to, and configured to deliver, water to the into the resin bed in the holding tank, such as for washing/rinsing the resin bed. The holding tank 110 and the input lines 160a-160d can be operably coupled together via one or more valves and conduits configured to provide a selectively changeable connection therebetween. For example, one or more valves may be actuated to cause a solution from the first input line 160a to flow into the holding tank 110, and then another set of valves may be actuated to cause a solution from the second input line 160b to flow into the holding tank 110, and so on.

In embodiments (not shown), the system can include equipment to wash and/or remove at least some of the broken resin beads from the resin bed. The system can include resin back-wash equipment to periodically remove broken resin beads from unbroken resin beads. In an embodiment, the system can include vacuum equipment to remove at least a portion of the resin bed (e.g., the entire resin bed) from the resin tank via vacuum force and transport the same to the back-wash equipment. In embodiments, the back wash equipment can include a tank with a conical bottom having an inlet at the bottom and an overflow outlet at the top. The resin bed can be fluidized (at least 100% bed expansion) with water entering the back-wash tank from the bottom (up-flow mode) and leaving the tank from the top outlet, carrying with it the broken (e.g., attritioned) resin beads as it exits the conical tank. The water exiting the tank can be directed to a small tank or fluid line with a strainer therein sized to remove the broken resin beads from the water. The broken resin beads are separated from the water carrying them in the small tank where the strainer retains the broken resin beads, while allowing the separated water (devoid of broken resin beads) to pass through and recycle back to the back-wash tank, such as via a pump, to keep the resin bed fluidized. The unbroken resin beads remain in the conical tank. The resin bed can be backwashed in this manner for at least one minute such as 1 minute to 1 day, 1 minute to 1 hour, 1 minute to 10 minutes, 2 minutes to 30 minutes, or less than about 30 minutes. After resin is back-washed, the resin bed left in the back-wash tank (e.g., containing unbroken resin beads) can be transported back to the resin tank, such as by using a vacuum pump. At least one resin back-wash system can serve more than one train of resin beds in resin tanks of the system. In embodiments, such back-washing can be performed periodically, such as weekly, monthly, bimonthly, semi-annually, annually, etc.

A known volume of the resin is held in the tank and is referred to as the resin bed 120 and its volume is a one bed volume. The processes herein comprise two major steps: in the first major step, the sulfate ions are adsorbed from the lithium sulfate feed solution (e.g., contacting solution) by exchanging them with the hydroxyl ions on the ion exchange resin. Such an exchange can be produced by contacting/soaking (both terms are used herein to provide the same meaning but are used to imply a different occurrence thereof) the ion exchange resin (having hydroxyl ions bound thereto) with a lithium sulfate solution first. Subsequently, the ion exchange process is reversed. That is, the sulfate ions on the ion exchange resin are displaced by hydroxyl ions by soaking/contacting the resin bed with a caustic (e.g., sodium hydroxide) solution. Between each major step, the resin bed can be washed/rinsed (both terms are used herein to provide the same meaning but differentiate between different occurrences thereof) with de-ionized water to displace the solutions held in the ion exchange resin pores as much as practical. Water washes/rinses after each step may be one or more, using straight wash or split wash methods.

One bed volume of the feed or input solution(s) can be used in each step (sulfate ions removal from the lithium sulfate solution in the first step and hydroxyl ions removal from the sodium hydroxide solution during the second step) to maximize sulfate and hydroxyl ions adsorptions by the resin bed from their respective feed solutions to produce lithium hydroxide solution with only trace levels of sulfate from the first major step and sodium sulfate solution with trace levels of hydroxyl ions from the second major step.

The contact time of any of the solutions with the resin bed can be held as small as needed, varying from one second to few minutes (e.g., at least one second, at least 5 seconds, at least 10 seconds, at least 30 seconds, at least 1 minute, at least 5 minutes, at least 10 minutes), to achieve as high a number of batches a day as practical.

One complete batch includes the following sequence. In the first major step, the resin bed 120 in the hydroxyl form (e.g., having hydroxyl ions bound thereto) is brought in contact with the lithium sulfate feed solution (e.g., contacting solution) for a selected time. The first major step can be performed while keeping the resin bed gently moving by agitation (e.g., using an overhead mixer or sonication). Contacting the resin bed with the contact solution (lithium sulfate) can be followed by draining the contact solution (e.g., solution that is predominantly lithium hydroxide instead of lithium sulfate after the resin bed contact) from the resin bed into a receiver or container first by gravity and then under vacuum. Draining the resin bed can be followed by water washing the resin bed once or more, one contact at a time.

In the second major step, the washed resin bed (e.g., washed after the first major step) is soaked or brought in contact with a caustic (e.g., sodium hydroxide) solution of a chosen strength for a given time. The soaking can be performed while keeping the resin bed gently moving by agitation such as by an overhead mixer. Soaking the washed resin bed with the caustic solution can be followed by draining the caustic solution (converted to a sodium sulfate solution via ion exchange during the soaking) from the bed into a receiver first by gravity and then under vacuum. Draining the caustic solution can be followed by water washing the resin bed once or more, one contact at a time. The concentration (e.g., molarity) of the lithium salt solution (e.g., dissolved lithium salts in the contacting solution prior to contact with the resin bed) can be at least 0.0001 mol/L, at least about 0.1 mol/L, at least about 1 mol/L, or at least 3 mol/L. The molarity of the caustic solution (prior to contact with the resin bed) can be at least 0.1 mol/L, such as at least about 1 mol/L, or 3 mol/L or more.

The above steps can be repeated to produce as many batches in a day as practical.

A total batch time (depending on the process conditions and resin type) could vary from a few minutes to an hour, such as from 30 to 60 minutes, allowing making 24 to 48 batches a day. The equivalence of sulfate ions loading on the ion exchange resin in the first contact with the lithium salt (e.g., lithium sulfate) can vary from a fraction of resin saturation capacity for sulfate ion to a resin theoretical capacity for sulfate ion depending upon the resin type and process conditions. For example the sulfate loading of an anionic resin, reported by one resin supplier, is about 1 g equiv/l when contacted with one bed volume of one normal lithium sulfate solution while keeping the sulfate leakage low, at trace levels. The theoretical capacity of this resin may be greater than 1.5 g equiv/l. The theoretical capacity of some resins may be about 0.75 g equiv/l of resin or more, such as about 0.75 g equiv/1 to 1.5 g equiv/l, or about 1.0 g equiv/1 to 1.5 g equiv/l, or about 1.5 g equiv/1 to 3.0 g equiv/l of resin depending upon the resin type. The trace sulfate impurity levels in the lithium hydroxide product solution in this example can be isolated by using barium hydroxide to precipitate sulfate out as insoluble barium sulfate or by using conventional ion exchange process, such as a water softener system using anion resin bed in OH form instead of cation form. So, by manipulating the bed volumes of the contact solution and its sulfate concentration, selected amounts of sulfate loading on the resin with almost no or only trace leakage of sulfate, can be achieved in the processes disclosed herein. The higher the loading on the resin, the smaller the resin inventory required by the process. However, it could be at the expense of higher sulfate leakage requiring sulfate removal from the lithium hydroxide product later on, which may or may not be an attractive option. The desorption equivalence of the counter ions (e.g., sulfate ions) on the ion exchange resin by hydroxyl ions in the second soaking step would be the same as in the first contact for the sulfate in terms of g equiv/1 value.

The lithium hydroxide solution produced from the first major step can be further processed using standard multiple-effect evaporation to produce lithium hydroxide monohydrate from lithium hydroxide solution.

The sodium sulfate solution produced from the second major step can be further processed to crystallize sodium sulfate product if there is market for it. In the case of no market, the option to place the sulfate solution in an evaporation/tailings pond, temporarily or permanently, can be exercised in this case. Such disposal in an evaporation/tailings pond is just not conceivable in the processes currently employed by some, as it would lead to lithium values going to the pond as well as with the sodium sulfate solution, causing substantial lithium loss. In such a case, the sodium sulfate crystallization/drying/handling, and disposal is absolutely required; substantially adding to the capital and operating costs of the operation.

In some cases, where the lithium sulfate solution is high in concentration such as greater than one normal or the actual theoretical exchange capacity or close to it is targeted, a two-stage ion exchange set-up could be used, wherein the drained solutions from the steps are further contacted with another resin bed housed in the second ion exchange set-up, similar to the first, underneath the first set-up (e.g., in series). This configuration would possibly reduce the resin bed volume used in each stage, while possibly increasing the resin inventory of the system as a whole and could be an attractive option in some cases.

It is important that the lithium sulfate solution is as pure as practical to keep the process as simple as possible. If it has cation and anion (e.g., trace) impurities, it might be an attractive option to first, pass the solution through a conventional ion exchange system, comprised of cation exchange resin bed in a column in the lithium form and anion exchange resin bed in a column in the sulfate form to remove the impurities, instead of not removing them. The same applies to the sodium hydroxide solution used in the second step if it has significant levels of both cation and anion impurities. The option to purchase a high grade caustic, costing slightly more, is available in this case.

The water washes after each step may ensure that the residual solutions (e.g., the first contact solution (lithium salt solution and/or lithium hydroxide in the first step) and the second soaking solution (the caustic solution and/or sodium sulfate solution in the second step)) retained by the resin pores are substantially completely displaced by the wash waters. The split wash method, where the resin bed is first washed with the stored washed water generated by the second wash and the second wash is done with fresh water, is preferred over the straight wash method as it conserves water. The washed water from the first wash in the first major step, the most concentrated wash of all, can either be absorbed in the process as is or can be further concentrated by evaporation or reverse osmosis methods before sending it back to the process. The water recovered in either technique is recycled back to do more washes, reducing overall water usage. This water recovery technique, or one similar to it, can be employed for all the water washes of the two steps, if necessary.

Since it is desirable to have no sulfate presence in the lithium hydroxide solution produced by the processes disclosed herein, it might be possible to achieve that condition by treating trace or residual levels of sulfate present in the lithium hydroxide solution (e.g., after contact of the first solution with the ion exchange resin) with barium hydroxide to precipitate out sulfate as barium sulfate, which is highly insoluble. For sodium sulfate product from the second major step, presence of some hydroxyl ions in this soaking solution after contact with the ion exchange resin can be removed by using sulfuric acid to convert it to sodium sulfate.

The choice of the second step contact/soaking solution could be potassium hydroxide, ammonium hydroxide, etc. instead of sodium hydroxide producing potassium sulfate and ammonium sulfate by-products instead of sodium sulfate if lithium sulfate is the feed solution of the first step. If lithium chloride is the feed solution of the first step instead of lithium sulfate, then the by-products would be the chlorides of the alkali solution type selected for the second step. The by-product in the contacting/soaking solution can include one or more of sodium sulfate, potassium sulfate, sodium chloride, potassium chloride, or sodium nitrate, or potassium nitrate.

In examples, the processes disclosed herein may be used to purify a lithium hydroxide solution contaminated with one or more anions such as sulfate, chloride, nitrate, etc. In such examples, the feed to the system would be a lithium hydroxide contaminated solution instead of lithium sulfate solution. In such examples, the lithium sulfate solutions in the processes disclosed herein may be substituted with a lithium hydroxide solution and vice versa.

The disclosed process is simple as it uses equipment familiar to the operators and does not require special skills to operate it. The electrochemical process it replaces is a highly specialized process and requires specially trained and skilled workers to operate it. The disclosed process potentially offers a huge advantage in capital cost savings. It uses relatively less expensive equipment such as few tanks, mixers, pumps, low resin inventory, and reverse osmosis units as compared to the equipment used by an electrochemical system which requires electrochemical cells with anodes and cathodes, cation membranes between the electrodes, frames holding the cells together, heavy copper bus-bars, rectifier, chiller or cooling tower, network of piping, advance instrumentation and control equipment, more elaborate and expensive system installation, etc. While the actual cost estimates of the two systems cannot be determined without carrying out their cost studies, it is evident from the type of equipment used by each that the disclosed process would potentially be significantly lower in capital cost than the electrochemical process. For a production plant producing ten million kilos of lithium hydroxide monohydrate annually, the potential savings in the capital cost are estimated to be in the million dollars. For the stated production rate, assuming 24 batches a day and sulfate loading of 1 g equiv/l on the resin, the resin volume required is estimated to be about 1000 cu ft., which could be housed in 6 to 10 parallel trains of the disclosed ion exchange system, each accommodating about 100 to 150 cu ft. of resin bed. Comparatively, for the electrochemical system, it is estimated, would require about 250 cells with anodes, cathodes, and cation membranes (each 2.7 $M^2$ in area), frames holding the cells, substantial and elaborate cooling systems to dissipate heat generation, fairly good size rectifiers and bus bars, complicated network of piping system, advance instrumentation and control system to ensure safe operation, fairly good size exhaust system to vent oxygen and hydrogen gases generated by the process, especially the hydrogen gas which is flammable and requires significant air dilution before safe atmospheric discharge if it is not captured for fuel or energy source.

In examples, the processes disclosed herein, or any portions thereof, may be carried out substantially simultaneously in a Higgins Loop contactor, where resin flows counter current to the solution. In examples, the processes disclosed herein, or any portions thereof, may be carried out substantially simultaneously in a carousel system where one or more containers with resin beds (on the carousel) are moved instead of resin therein.

The disclosed process will have an advantage in the operating cost as well. The cost of the chemicals used by the proposed process for producing lithium hydroxide from the lithium carbonate salt for example, sulfuric acid and sodium hydroxide, amounts to between 30 to 40 cents per kg of the product (lithium hydroxide monohydrate) without crediting for the revenue of the by-product, sodium sulfate. This cost can be cut by almost half (e.g., 15 to 20 cents/kg of product) if the lithium sulfate solution is generated by acid leaching of lithium ore concentrate instead of lithium sulfate generated from acidifying lithium carbonate. While the electrochemical process does not use any chemicals, it produces one instead: sulfuric acid when doing lithium sulfate electrolysis. The significant operating cost in this process, compared to the disclosed chemical process, is the power cost which is estimated at over 4 or 5 kwh/kg of product, such as between 4.5 to 5.25 kwh/kg of product. Depending on the unit price of electricity, the power cost in many locations could be much higher than the chemical costs noted herein for the proposed process. The maintenance cost is another cost item, where the disclosed process is likely to have a lower maintenance cost.

Though an accurate comparison of operating costs of the two processes cannot be estimated without doing a detailed cost study, it is apparent that the disclosed process would provide some cost savings in the operating cost as well.

While various aspects and embodiments have been disclosed herein, other aspects and embodiments are contemplated. The various aspects and embodiments disclosed herein are for purposes of illustration and are not intended to be limiting.

What is claimed is:

1. A system for producing lithium hydroxide from lithium salts, the system comprising:
   a holding tank having at least one drain;
   a resin bed including an anion exchange resin therein, the resin bed having a height less than or equal to a height of the holding tank, the anion exchange resin including hydroxide ions bound thereto;
   a retention member disposed in the holding tank between the resin bed and the at least one drain, the retention member being configured to retain the resin bed in the holding tank;
   a plurality of input lines, including:
      a first input line operably coupled to a supply of, and configured to deliver, a lithium salt solution into the resin bed in the holding tank;
      a second input line operably coupled to a supply of, and configured to deliver, a caustic solution into the resin bed in the holding tank;
      at least a third input line operably coupled to, and configured to deliver, water to the into the resin bed in the holding tank;
   a plurality of output containers, including:
      a first output container configured to hold a lithium hydroxide solution produced in the resin bed from interaction thereof with the lithium salt solution;
      a second output container configured to hold a sodium salt solution produced in the resin bed from interaction thereof with the caustic solution; and
      at least a third output configured to hold one or more of a wash or rinse solution from the resin bed; and
   one or more valves and fluid lines operably coupled to the first input line, the second input line, the at least a third input line, the first output container, the second output container, the at least a third output container, and the holding tank.

2. The system of claim 1, further comprising at least one vacuum pump operably coupled to one or more of the drain or the first output container, the second output container, and the at least a third output container.

3. The system of claim 1, further comprising at least one agitator positioned and configured to agitate the resin bed.

4. The system of claim 1, further comprising:
   the supply of the lithium salt solution operably coupled to the first input line;
   the supply of the caustic solution operably coupled to the second input line; and
   a supply of water operably coupled to the at least a third input line.

5. The system of claim 1, wherein the holding tank is configured to be drained via one or more of gravity feed or vacuum force.

6. The system of claim 1, wherein the system includes a plurality of holding tanks each arranged in series such that a first holding tank having a first resin bed therein can be drained into at least a second holding tank having a second resin bed therein.

7. The system of claim 6, wherein the plurality of holding tanks are arranged and positioned such that at least some of the plurality of holding tanks can feed a subsequent holding tank of the plurality of holding tanks with a solution drained therefrom via one or more of a gravity feed or vacuum force.

8. The system of claim 1, wherein the system includes equipment for back-washing the resin bed to remove broken resin beads.

9. A system for producing lithium hydroxide from lithium salts, the system comprising:
   a holding tank having at least one drain;
   a resin bed including an anion exchange resin therein, the resin bed having a height less than or equal to a height of the holding tank, the anion exchange resin including hydroxide ions bound thereto;
   a retention member disposed in the holding tank between the resin bed and the at least one drain, the retention member being configured to retain the resin bed in the holding tank;
   a plurality of input lines, including:
      a first input line operably coupled to a supply of, and configured to deliver, a lithium salt solution into the resin bed in the holding tank;
      a second input line operably coupled to a supply of, and configured to deliver, a caustic solution into the resin bed in the holding tank;
      at least a third input line operably coupled to, and configured to deliver, water to the into the resin bed in the holding tank;
   a plurality of output containers for receiving one or more fluids from the holding tank; and
   one or more valves and fluid lines operably coupled to the first input line, the second input line, the at least a third input line, and the holding tank.

10. The system of claim 9, further comprising at least one vacuum pump operably coupled to one or more of the drain.

11. The system of claim 9, further comprising at least one agitator positioned and configured to agitate the resin bed.

12. The system of claim 9, further comprising:
the supply of the lithium salt solution operably coupled to the first input line;
the supply of the caustic solution operably coupled to the second input line; and
a supply of water operably coupled to the at least a third input line.

13. The system of claim 9, wherein the holding tank is configured to be drained via one or more of gravity feed or vacuum force.

14. The system of claim 9, wherein the system includes a plurality of holding tanks each arranged in series such that a first holding tank having a first resin bed therein can be drained into at least a second holding tank having a second resin bed therein.

15. The system of claim 9, wherein the system includes equipment for back-washing the resin bed to remove broken resin beads.

16. A system for producing lithium hydroxide from lithium salts, the system comprising:
a holding tank having a height and at least one drain;
a resin bed including an anion exchange resin therein, the resin bed having a height less than or equal to the height of the holding tank, the anion exchange resin including hydroxide ions bound thereto;
a retention member disposed in the holding tank between the resin bed and the at least one drain, the retention member being configured to retain the resin bed in the holding tank;
at least one agitator positioned and configured to agitate the resin bed;
a plurality of input lines, including:
a first input line operably coupled to a supply of, and configured to deliver, a lithium salt solution into the resin bed in the holding tank;
a second input line operably coupled to a supply of, and configured to deliver, a caustic solution into the resin bed in the holding tank;
at least a third input line operably coupled to, and configured to deliver, water to the into the resin bed in the holding tank;
a plurality of output containers, including:
a first output container configured to hold a lithium hydroxide solution produced in the resin bed from interaction thereof with the lithium salt solution; and
a second output container configured to hold a sodium salt solution produced in the resin bed from interaction thereof with the caustic solution; and
equipment for back-washing the resin bed to remove broken resin beads.

17. The system of claim 16, further comprising at least one vacuum pump operably coupled to one or more of the drain or the first output container, the second output container, and the at least a third output container.

18. The system of claim 16, further comprising:
the supply of the lithium salt solution operably coupled to the first input line;
the supply of the caustic solution operably coupled to the second input line; and
a supply of water operably coupled to the at least a third input line.

19. The system of claim 16, wherein the system includes a plurality of holding tanks each arranged in series such that a first holding tank having a first resin bed therein can be drained into at least a second holding tank having a second resin bed therein.

20. The system of claim 16, wherein the equipment for back-washing the resin bed includes:
a back-wash tank with a conical bottom having an inlet at the bottom and an overflow outlet at the top;
a fluid feed supply operably coupled to the inlet of the back-wash tank to fluidize resin beads of the resin bed disposed in the back-wash tank and carry broken resin beads from the fluidized resin beads through the overflow outlet.

* * * * *